(12) United States Patent
Kousens et al.

(10) Patent No.: US 9,556,896 B2
(45) Date of Patent: Jan. 31, 2017

(54) FLOATING BARREL NUT ASSEMBLY AND RELATED METHODS

(71) Applicants: William Kousens, El Cajon, CA (US); Tam Nguyen, El Cajon, CA (US)

(72) Inventors: William Kousens, El Cajon, CA (US); Tam Nguyen, El Cajon, CA (US)

(*) Notice: Subject to any disclaimer, the term of this patent is extended or adjusted under 35 U.S.C. 154(b) by 0 days.

(21) Appl. No.: 14/659,462

(22) Filed: Mar. 16, 2015

(65) Prior Publication Data

US 2015/0192169 A1 Jul. 9, 2015

Related U.S. Application Data

(62) Division of application No. 13/454,015, filed on Apr. 23, 2012, now Pat. No. 8,998,548.

(51) Int. Cl.
*F16B 41/00* (2006.01)
*F16B 37/04* (2006.01)

(52) U.S. Cl.
CPC ........... *F16B 41/002* (2013.01); *F16B 37/044* (2013.01); *Y10S 411/965* (2013.01); *Y10T 29/49947* (2015.01); *Y10T 29/49948* (2015.01)

(58) Field of Classification Search
CPC  F16B 41/002; F16B 37/044; Y10T 29/49947; Y10T 29/49948; Y10S 411/965
See application file for complete search history.

(56) References Cited

U.S. PATENT DOCUMENTS 3,205,927 A * 9/1965 Phelan .................. F16B 37/047
411/104

* cited by examiner

*Primary Examiner* — John C Hong
(74) *Attorney, Agent, or Firm* — Buche & Associates, P.C.; John K. Buche; Bryce A. Johnson

(57) ABSTRACT

A floating barrel nut may be used to retain a nut in a seat of a segmented cylindrical slug. In one embodiment, the barrel nut according to this disclosure may comprise: a nut with a threaded shaft and a flange that is chamfered on its lower end; a cylindrical slug that has been segmented along a plane that is parallel to the cylindrical axis, said slug having a head and a foot; two pins; wherein said nut is configured to float between the head and foot of the slug; wherein said shaft features an indentation on opposite sides thereof; and, wherein said pins are attached to the head and foot of the slug and sit in the indentations of the shaft. In another embodiment the pins are bent around the shaft.

20 Claims, 7 Drawing Sheets

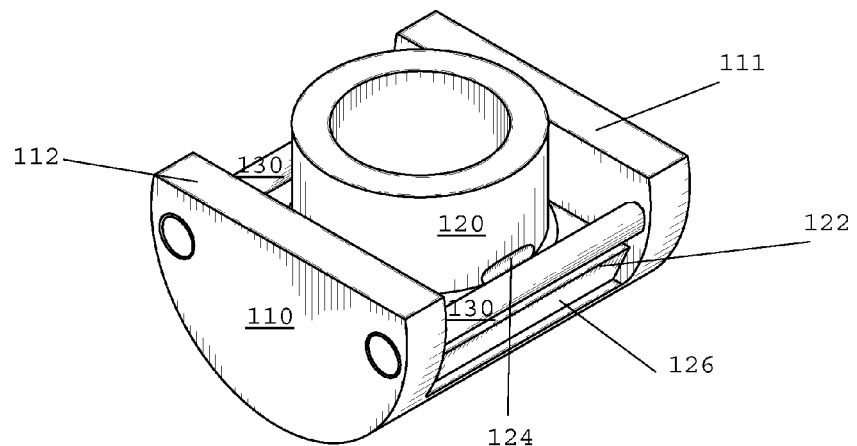
FIG. 1
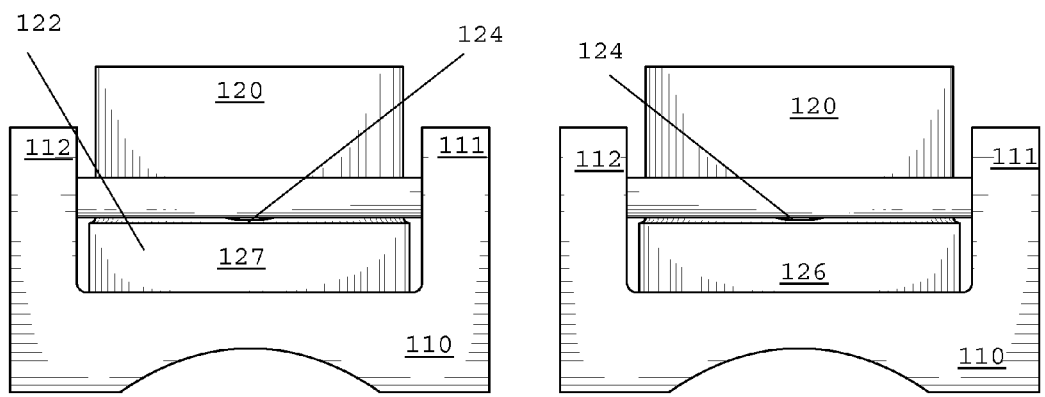
FIG. 2  FIG. 3

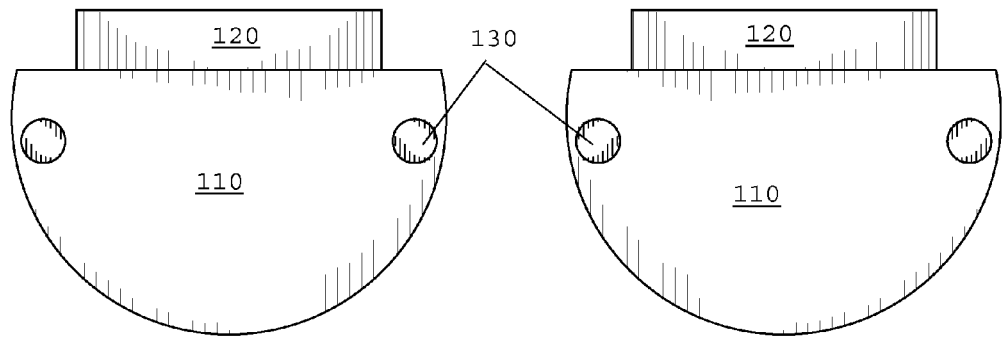
FIG. 4   FIG. 5
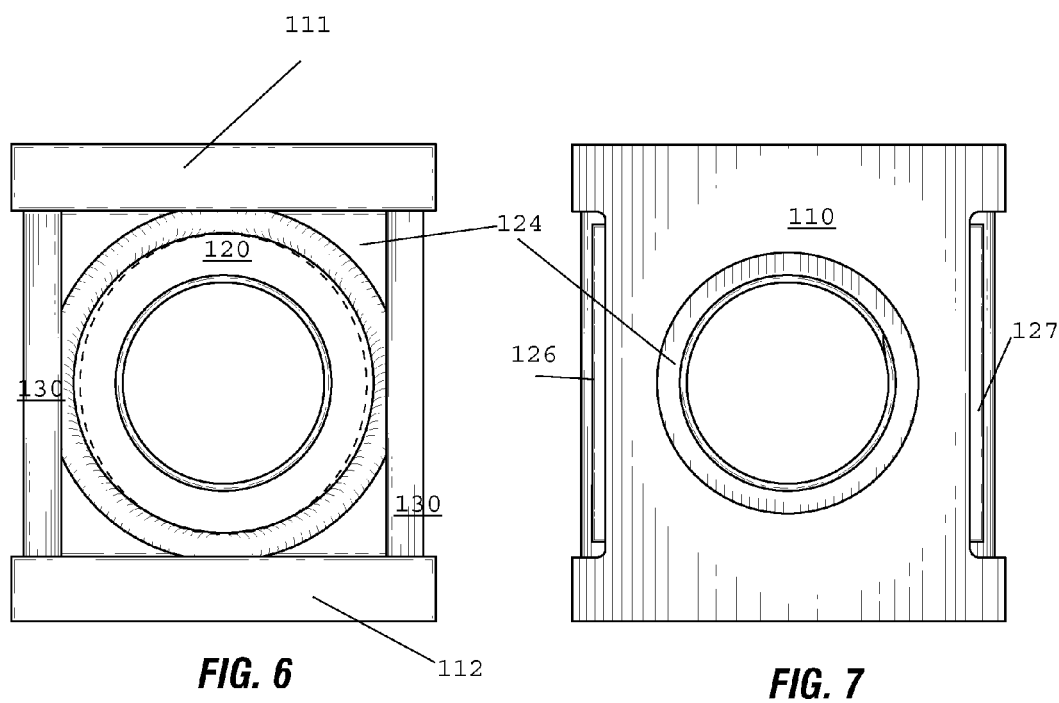
FIG. 6   FIG. 7

FLOATING BARREL NUT ASSEMBLY AND RELATED METHODS

CROSS-REFERENCE TO RELATED APPLICATIONS

This application is a divisional application of U.S. patent application Ser. No. 13/454,015 (filed Apr. 23, 2012) entitled "Floating barrel nut assembly and related methods," and that document is hereby incorporated by reference in its entirety.

STATEMENT REGARDING FEDERALLY SPONSORED RESEARCH OR DEVELOPMENT

Not applicable.

BACKGROUND OF THE INVENTION

Field of Invention

The present application is within the field of threaded fasteners. In particular, this application is in the field of barrel nuts.

Background of the Invention

A barrel nut is typified by a segmented cylindrical slug (segmented by a plane that is parallel to the cylindrical axis) with a threaded bore that is perpendicular to the length of the segmented cylinder. See, e.g., U.S. Pat. No. 1,671,757 (issued May 29, 1928) or U.S. Pat. No. 2,809,686 (issued Oct. 15, 1957). Operably, barrel nuts may be employed for fastening together panels, wherein the slug of the barrel nut is positioned inside a cylindrical hole in one panel so that the nut's threaded bore is transverse to the cylindrical hole and aligned with an access hole formed in the other panel. When so positioned inside a cylindrical hole, the barrel nut is captive or self-wrenching so that a bolt can be inserted through the access hole and threaded into the nut. Given said operability, the threaded bore of a barrel nut is frequently configured to float within the segmented cylindrical slug so that some alignment between the threaded bore and the access hole can be achieved after insertion of the nut into the cylindrical hole. Said floating configuration is typically accomplished by loosely providing a nut to a seat formed in the segmented side of the slug. See, e.g., U.S. Pat. No. 2,903,035 (issued Sep. 8, 1959), U.S. Pat. No. 2,920,672 (issued Jan. 12, 1960), U.S. Pat. No. 3,081,809 (issued Mar. 19, 1963), U.S. Pat. No. 3,192,982 (issued Jul. 6, 1965), U.S. Pat. No. 3,205,927 (issued Sep. 14, 1965), U.S. Pat. No. 3,322,177 (issued May 30, 1967), U.S. Pat. No. 4,119,130 (issued Oct. 10, 1978), U.S. Pat. No. 4,861,207 (issued Aug. 29, 1989), and U.S. Pat. No. 5,032,047 (issued Jul. 16, 1991). Floating barrel nuts become useless whenever the loose nut disassociates from its seat in the slug. Thus, a need exists for a means for retaining the nut within its seat in the segmented cylindrical slug of a barrel nut.

One approach to retaining a nut in a seat of a segmented cylindrical slug of a barrel nut is shown in U.S. Pat. Nos. 2,903,035; 2,920,672; 3,081,809; 3,192,982; and 3,205,927. In those patents, a nut with a square flange and threaded shaft is seated in the segmented side of the slug via sliding the nut along its flange between a head and foot at either end of the slug in a direction that is parallel to the segment plane. Still referring to those patents, the nut is retained in its seat via placing a small pin through the head and foot at opposite corners of the segment plane so that the nut is confined within the seat via interaction between the pins and the nut's flange or shaft. Although a common means for retaining a nut in the slug of a barrel nut, a pin has not been a satisfactory nut retaining means in many instances because the pin, being secured to the slug at only one of its ends, can be easily bent whereby the pin no longer interacts with the flange or shaft of the nut to retain the nut in its seat. Thus, a need still remains for a more effective means for retaining the nut within its seat in the segmented cylindrical slug.

In view of the foregoing, the pin may be improved as a retaining means by extending each pin across the entire length of the slug so that it is connected at both the head and foot of the slug. Thus far, this has been practically unachievable in view of the NAS 577 standard for barrel nuts. Front views of a NAS 577 barrel nut 1 with a nut 10 and slug 14 is provided as FIGS. 10A and 10B. According to said NAS standard, with reference to FIGS. 10A and 10B, the edge of the cylindrical shaft 11 of the nut 10 corresponds with the edge of the flange 12 so that the extension of the pin 13 across the slug 14 is blocked by the shaft 11 of the nut 10. Referring to FIG. 10A, this blockage cannot be avoided by moving the pins 13 outward (in dashed lines) relative to the nut because, in such a configuration, the nut 10 would not be retained by the pins (see FIG. 10A). Referring to FIG. 10B, the pin location cannot be moved outwardly by extending the flange 12 (in dashed lines) on the sides of the floating nut 10 because such extension would result in the flange 12 protruding beyond the curving surface of the slug 14 whereby the profile of the barrel nut 1 would not be a semi-circle (see FIG. 10B). U.S. Pat. Nos. 5,032,047 and 3,192,982 appear to disclose barrel nut structures that are stabilized via attachment of said structures at both the head and foot of the slug of a barrel nut, but said structures are for purposes of positioning a barrel nut inside the cylindrical hole of a panel and do not serve nut retention purposes beyond the pins described above. As result, a need still remains for a more effective means for retaining the nut within its seat in the segmented cylindrical slug of a barrel nut.

SUMMARY OF THE INVENTION

In view of the forgoing, it is an objective of this specification to disclose a floating barrel nut with improved means for retaining a nut in a seat of a segmented cylindrical slug and related methods. In one embodiment, a barrel nut according to this disclosure may comprise: a nut with a threaded shaft and a flange that is chamfered on its lower end; a cylindrical slug that has been segmented along a plane that is parallel to the cylindrical axis, said slug having a head and a foot; two pins; wherein said nut is configured to float between the head and foot of the slug; wherein said shaft features an indentation on opposite sides thereof; and, wherein said pins are attached to the head and foot of the slug and sit in the indentations of the shaft. In another embodiment the pens are bent or bowed around the shaft. In yet another embodiment, the indentations are on the pins instead of the shaft.

BRIEF DESCRIPTION OF THE FIGURES

Other objectives of the disclosure will become apparent to those skilled in the art once the invention has been shown and described. The manner in which these objectives and other desirable characteristics can be obtained is explained in the following description and attached figures in which:

FIG. 1 is a perspective view of a barrel nut assembly;

FIG. 2 is a left side view of the barrel nut assembly of FIG. 1;

FIG. 3 is a right side view of the barrel nut assembly of FIG. 1;

FIG. 4 is a front side view of the barrel nut assembly of FIG. 1;

FIG. 5 is a back side view of the barrel nut assembly of FIG. 1;

FIG. 6 is top view of the barrel nut assembly of FIG. 1;

FIG. 7 is a bottom view of the barrel nut assembly of FIG. 1;

Figure 8:
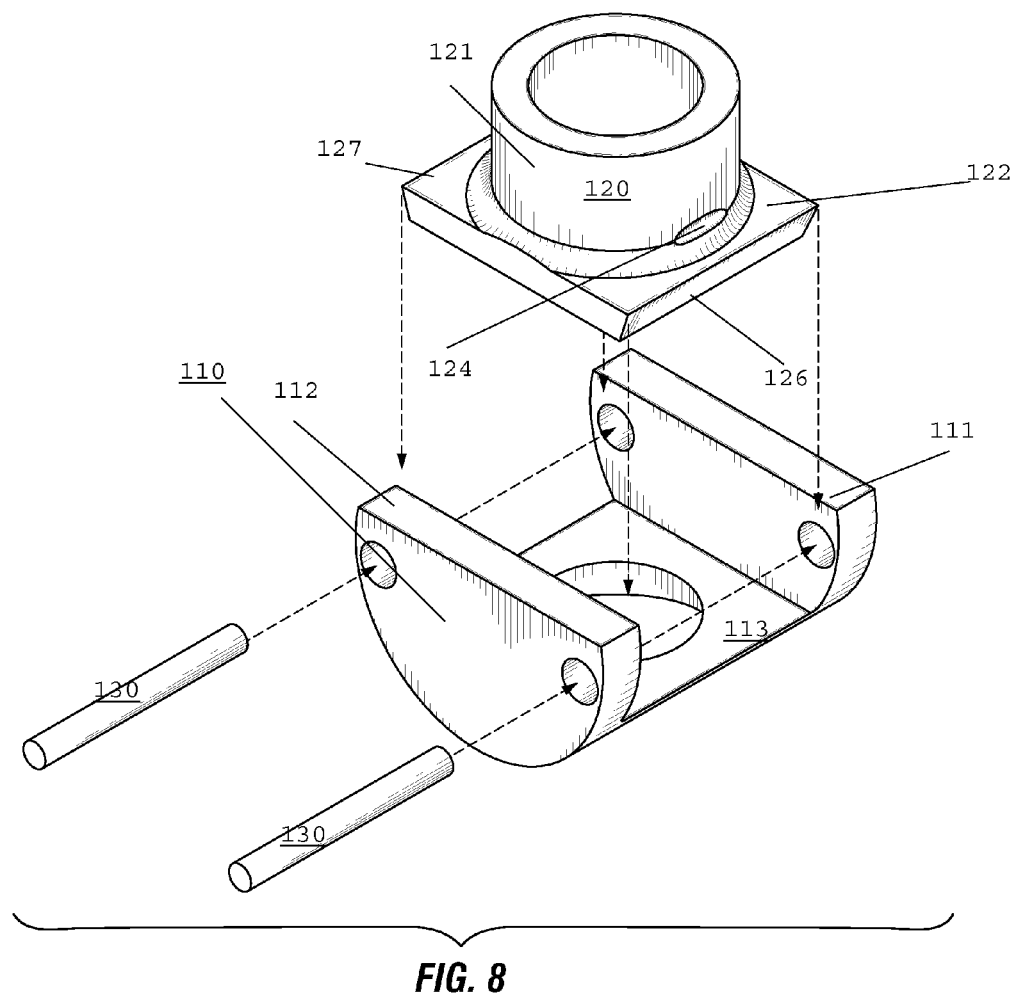
FIG. 8 is an exploded view of the barrel nut assembly of FIG. 1.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed generally is a floating barrel nut assembly with improved means for retaining a nut in a seat of a segmented cylindrical slug and related methods. In a preferred embodiment, a barrel nut according to this disclosure has a floating nut with a shaft and chamfered flange that is retained in a seat of a segmented cylindrical slug by pins that are attached at opposite ends of the seat whereby the pins are provided over the flange and around the shaft of the floating nut. The more specific aspects of this disclosure are described with reference to the attached FIGS. 1 through 9.

FIGS. 1 through 9 are respectively, a perspective view, a left side view, a right side view, a front side view, a back side view, a top view, an exploded view, and a cross-section view of a barrel nut assembly 100. As shown in the drawings, the barrel nut assembly 100 features: a slug 110; a floating nut 120; and pins 130. The floating nut 120 is preferably configured to sit in the slug 110 so that it is retained thereby the pins 130.

The slug 110 is depicted in FIGS. 1 through 9. Referring to FIG. 8, the slug 110 is generally shaped like cylinder that is segmented by a plane that is parallel to the axis of the cylinder. Still referring to FIG. 8, the slug 110 features a cut-out forming a head 111, foot 112, and seat 113. As discussed further below and alluded to in FIG. 8, a floating nut 120 may preferably be seated in the seat 113 of the slug 110 between the head 111 and foot 112.

Figure 9:
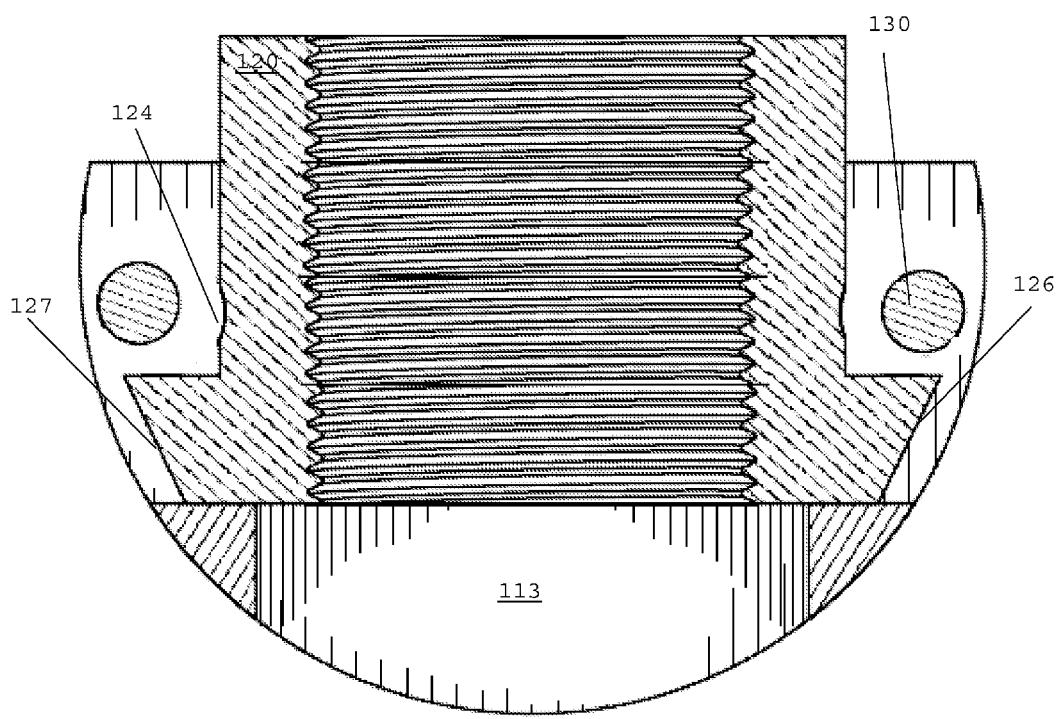
FIG. 9 is cross-section view of the barrel nut assembly of FIG. 1.
Figures 10A, 10B:
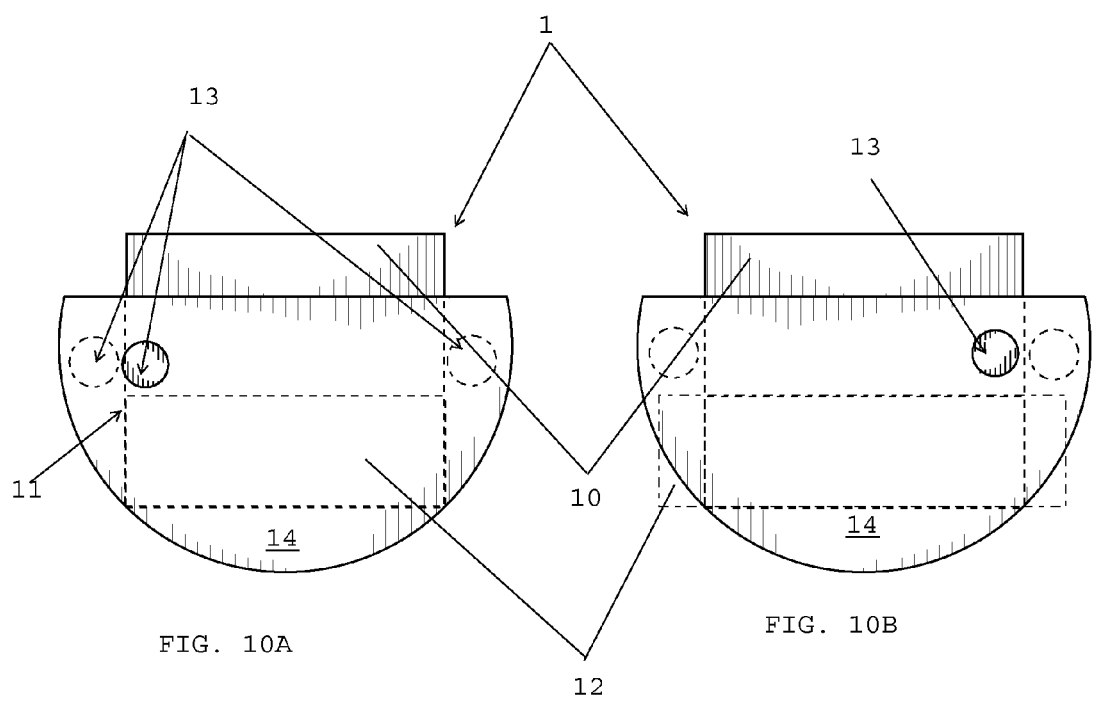
FIGS. 10A and 10B are respectively front and back views of a NAS577 barrel nut assembly.

The floating nut 120 is shown in FIGS. 1 through 9. As best seen in FIGS. 8 and 9, the floating nut 120 is defined by a shaft 121 and a flange 122. As shown in FIGS. 8 and 9 the shaft is generally cylindrical with (1) a threaded bore 123 disposed therethrough and (2) indentations 124 on opposite sides thereof. Still referring to FIGS. 8 and 9, the flange 122 is suitably four sided, wherein two sides 126, 127 thereof extend past the sides of the shaft 121 beneath the indentations 124. Preferably, as shown in FIG. 9, said extended sides 126, 127 are chamfered so that the flange 122 does not extend beyond the profile of the slug 110. It should be noted that, a preferable chamfer angle may be any angle that is oblique to the bottom surface of the nut wherein the flange 122 does not extend beyond the outside diameter of the slug 110 during its most most extreme transverse (side-to-side) float.

Figure 12:
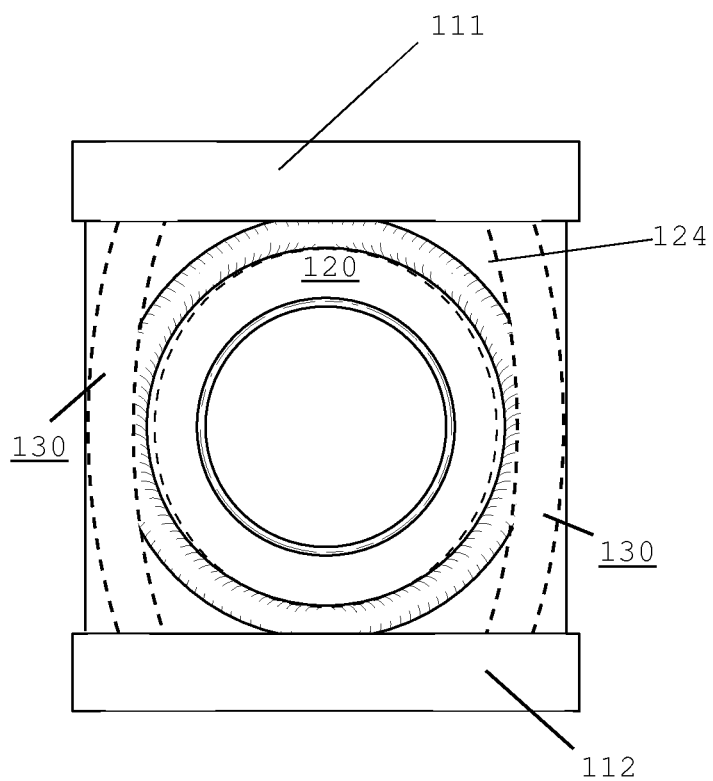
FIG. 12 is a top view of an alternative embodiment of the barrel nut assembly of FIG. 1.

The pins are shown in FIGS. 1 through 6, 8, and 9. As best seen in FIGS. 1, 6, and 8, the pins 130 are attached to the head 111 and foot 112 of the slug 110 by insertion through bores provided thereto. As best seen in FIG. 9, the pins 130 are preferably positioned (1) over the extended sides 126, 127 of the flange 122 and (2) adjacent said indentations 124. Although depicted as straight cylindrical pins 130, in an alternate embodiment of a barrel nut, the pins 130 may be bowed around the shaft 121 to increase the floating capabilities of the nut 120 (See FIG. 12). Although the indentations are shown on the shaft, in an alternate embodiment, the indentations may suitably be provided to the pins 130 so that the shaft is retained within the indentations of the pins.

A preferable mode of construction may suitably be: (1) machine the slug 110 with at least a seat 113 that is situated between a head 111 and foot 112; (2) machine a nut 120 with at least a chamfered flange 122 and shaft 121; (3) obtain two pins; (4) locate the nut 120 on the seat 123 of the slug 110 between the head 111 and foot 112 so that the extended and chamfered sides 126, 127 of the flange 120 extend transverse to the length of the slug 110; and (5) affix the pins on the side of the slug 110 between the head 111 and foot 112 so that the pins 130 extend over the extended sides 126,127 of the nut's 120 flange 122. In an alternate embodiment of the barrel nut 100, wherein increased float (e.g., additional clearance between the nut 120 and the pins 130) is desired, such increase in float can be accomplished by any one or more of the following additional steps: (a) grind, machine or form a corresponding indentation 124 into each side of the shaft 121 of the nut 120 (or alternatively into the two pins 130) whereby additional distance is created between the relative edge of the pins 130 and the shaft 121 of the slug 110); or (b) bow or bend the pins outwardly away from the haft 121 of the nut 120. Said optional or additional steps may also be employed whenever the structural stability of the barrel nut 100 requires placement of the pins 130 at a location on the slug 110 that is more toward the seated nut 120 than the outer side of the slug 110.

Figure 11B:
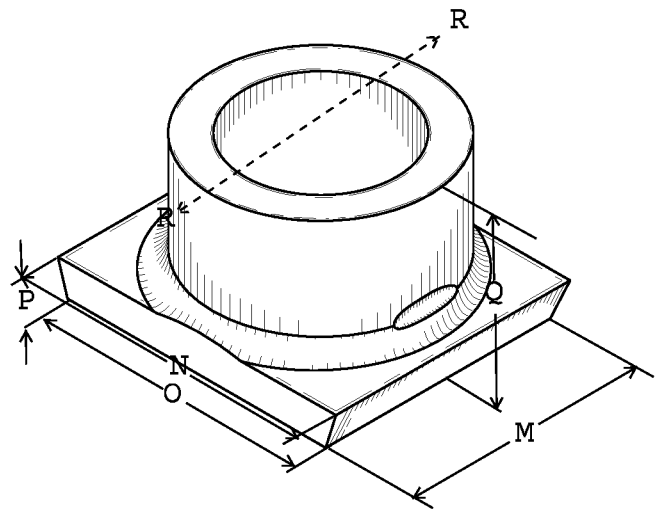
FIGS. 11A and 11B illustrate dimensions of the components of the barrel nut assembly of FIG. 1.
Figure 11A:
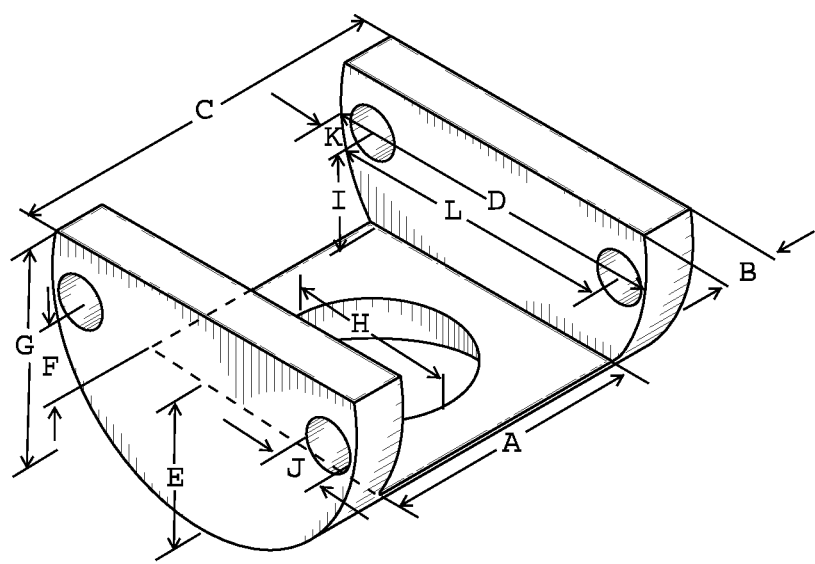

FIGS. 11A and 11B illustrate the following dimensions—
A: 0.540±0.010 inch;
B: 0.105±0.010 inch (NAS requires greater than or equal to 0.0625 inch);
C: 0.750±0.010 inch;
D: 0.6825±0.001 inch (diameter);
E: 0.156±0.005 inch;
F: 0.145±0.003 inch;
G: 0.415±0.005 inch;
H: 0.411±0.005 inch;
I: 0.145±0.003 inch (center of the pin 130 hole to the seat 113);
J: 0.063±0.001 inch (diameter);
K: within the range of 0.062±0.005 inch to 0.0967 inch (center of the pin 130 hole to the outermost periphery or outer diameter of the slug 110);
L: within the range of 0.555±0.001 inch to 0.5 inch;
M: 0.500±0.010 inch;
N: 0.620±0.010 inch;
O: 0.521±0.010 inch;
P: 0.100±0.003 inch;
Q: 0.355+0.010/−0.005 inch;
R: crimp direction (for additional float); and, S: 0.375-24 UNJF-3B (Per AS-8879) through hole, minor diameter 0.3344-0.3417 T/C minor 0.339±0.003 inch.

Those of skill in the art may know materials which are suitable for use in constructing barrel nuts according to the principles of this disclosure. Per NAS standards, alloy steel and Iconel may preferably be used for aerospace applications.

It should be noted that the above description and recited embodiments or examples are of illustrative importance only. In other words, the descriptions of the present disclosure should not be construed as limiting of the subject matter in this application. Additional modifications may become apparent to one skilled in the art after reading this disclosure.

I claim:

1. A method of fastening two items comprising the steps of:
   obtaining a barrel nut comprising a nut with a threaded shaft where the nut is floatably seated in a seat of a slug between a head of the slug and a foot of the slug, said nut further comprising a base with a flange, said slug featuring at least one pin connected between said head and foot of the slug, and wherein said at least one pin operates to floatably retain said nut in the seat by said at least one pin being positioned over the flange; and,
   placing the barrel nut in a hole of a first one of said two items so that a threaded shaft of the barrel nut is positioned:
   (a) transverse to an axis of said hole of the first one of said two items; and,
   (b) aligned with a access hole in a second one of said two items.

2. The method of claim 1 wherein the barrel nut unit further comprises:
   the flange featuring at least one chamfer.

3. The method of claim 2 wherein said at least one pin is a plurality of pins and wherein said plurality of pins are bowed.

4. The method of claim 3 wherein said nut features an indentation.

5. The method of claim 2 wherein said nut features an indentation.

6. The method of claim 5 wherein said indentation is located proximate to a meeting of the base of said nut and said flange.

7. The method of claim 2 wherein said flange features two chamfers.

8. The method of claim 2 wherein said at least one pin is connected at the head and foot of said slugs and at corresponding pin holes along a periphery of said head and foot.

9. The method of claim 8 wherein a distance from the periphery and an axis of said pin holes is within the range of 0.057 inch to 0.0967 inch.

10. A method of fastening two items comprising the steps of:
    obtaining a barrel nut assembly comprising:
    a nut with a cylindrical shaft, said nut being floatably seated in a slug;
    said nut further comprising indentations on opposite sides of the shaft; and,
    a plurality of pins that are connected to opposites ends of the slug so that (a) said nut is retained while floatably seated in said slug and (b) a portion of said pins is positioned near said indentations; and,
    placing the barrel nut assembly in a hole of a first one of said two items so that the cylindrical shaft of the barrel nut is positioned:
    (a) transverse to an axis of said hole of the first one of said two items; and,
    (b) aligned with a access hole in a second one of said two items.

11. The method of claim 10 wherein said plurality of pins are bowed.

12. The method of claim 10 wherein said nut further comprises a chamfered flange at a base of the shaft.

13. The method of claim 12 wherein the base has opposite sides and said flange is defined by the two chamfers being on opposite sides of the base.

14. A method of fastening two items comprising the steps of:
    obtaining a barrel nut assembly comprising:
    a nut with a cylindrical bore and a base, said nut seated in a slug;
    said nut further comprising a flange at said base;
    at least two pins connecting opposite ends of said slug; and
    said pins being fixed in apertures located along an outer periphery of each of the opposite ends of said slug; and,
    placing the barrel nut assembly in a hole of a first one of said two items so that the cylindrical shaft of the barrel nut is positioned:
    (a) transverse to an axis of said hole of the first one of said two items; and,
    (b) aligned with a access hole in a second one of said two items.

15. The method of claim 14 wherein a distance from a center point of the apertures located along said outer periphery to an edge of the slug end of the barrel nut assembly is in the range of 0.057 inch to 0.0967 inch.

16. The method of claim 14 wherein the flange of the barrel nut assembly features a chamfer.

17. The method of claim 14 further comprising two indentations in opposite sides of the nut.

18. The method of claim 17 wherein the nut transversely floats between said pins located in an indentation.

19. The method of claim 18 wherein said pins are bowed.

20. The method of claim 14 wherein said pins are bowed.

* * * * *